United States Patent
Goto et al.

(10) Patent No.: US 8,845,858 B2
(45) Date of Patent: Sep. 30, 2014

(54) METHOD FOR SEPARATING BONDED BODIES USING EXCIMER LIGHT IRRADIATION

(75) Inventors: Yoshitsugu Goto, Shibukawa (JP); Jun Watanabe, Shibukawa (JP); Norihiro Shimizu, Shibukawa (JP); Hiroyuki Kurimura, Shibukawa (JP); Isamu Ichikawa, Shibukawa (JP); Kenji Fukao, Shibukawa (JP); Yukihiro Morimoto, Himeji (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/704,882

(22) PCT Filed: Jun. 1, 2011

(86) PCT No.: PCT/JP2011/062628
§ 371 (c)(1),
(2), (4) Date: Dec. 17, 2012

(87) PCT Pub. No.: WO2011/158654
PCT Pub. Date: Dec. 22, 2011

(65) Prior Publication Data
US 2013/0092326 A1    Apr. 18, 2013

(30) Foreign Application Priority Data
Jun. 15, 2010    (JP) ................................ 2010-136236

(51) Int. Cl.
*B32B 38/10*    (2006.01)
*C09J 5/00*    (2006.01)
*B32B 38/00*    (2006.01)
*C09J 4/00*    (2006.01)

(52) U.S. Cl.
CPC .............. *B32B 38/0008* (2013.01); *C09J 5/00* (2013.01); *C09J 2205/31* (2013.01); *C09J 2205/302* (2013.01); *C09J 2433/00* (2013.01); *C09J 4/00* (2013.01)
USPC .......................................... 156/712; 156/753

(58) Field of Classification Search
None
See application file for complete search history.

(56) References Cited

U.S. PATENT DOCUMENTS

| 6,814,832 | B2 * | 11/2004 | Utsunomiya | 156/230 |
|---|---|---|---|---|
| 7,138,550 | B2 * | 11/2006 | Carr et al. | 568/667 |
| 7,850,813 | B2 * | 12/2010 | Aikawa et al. | 156/245 |
| 7,910,206 | B2 * | 3/2011 | Kiuchi et al. | 428/354 |
| 8,012,550 | B2 * | 9/2011 | Ylitalo et al. | 428/32.13 |
| 8,211,259 | B2 * | 7/2012 | Sato et al. | 156/247 |
| 2001/0031367 | A1 * | 10/2001 | Gilbert | 428/447 |
| 2001/0038969 | A1 * | 11/2001 | Hatakeyama et al. | 430/270.1 |
| 2002/0077493 | A1 * | 6/2002 | Ohsawa et al. | 558/46 |
| 2002/0161148 | A1 * | 10/2002 | Harada et al. | 526/242 |
| 2003/0024635 | A1 | 2/2003 | Utsunomiya | |
| 2009/0030107 | A1 | 1/2009 | Watanabe et al. | |
| 2009/0035580 | A1 * | 2/2009 | Chino et al. | 428/411.1 |
| 2009/0311474 | A1 | 12/2009 | Takahashi et al. | |
| 2010/0000670 | A1 | 1/2010 | Kurimura et al. | |
| 2010/0243159 | A1 * | 9/2010 | Nishio et al. | 156/344 |

FOREIGN PATENT DOCUMENTS

| CN | 1336867 A | 2/2002 |
|---|---|---|
| EP | 1 151 853 A1 | 11/2001 |
| JP | 6-264033 A | 9/1994 |
| JP | 8-274059 A | 10/1996 |
| JP | 2001-212900 A | 8/2001 |
| JP | 2003-113355 A | 4/2003 |
| JP | 2003-286464 A | 10/2003 |
| JP | 2004-91738 A | 3/2004 |
| JP | 2006-111716 A | 4/2006 |
| JP | 2006-188586 A | 7/2006 |
| JP | 2007-246860 A | 9/2007 |
| JP | 2009-131732 A | 6/2009 |
| JP | 2010-248353 A | 11/2010 |
| JP | 2010-270316 A | 12/2010 |
| WO | 2006/129678 A1 | 12/2006 |
| WO | 2008/018252 A1 | 2/2008 |
| WO | 2008/133104 A1 | 11/2008 |
| WO | 2011/049138 A1 | 4/2011 |

OTHER PUBLICATIONS

International Search Report for PCT/JP2011/062628, mailing date of Aug. 30, 2011.
Translation of the International Preliminary Report on Patentability (PCT/IB/338) (1 page), (PCT/IB/373) (1 page) of International Application No. PCT/JP2011/062628 mailed Jan. 24, 2013 (Form PCT/ISA/237) ( 4 page).

* cited by examiner

Primary Examiner — Philip Tucker
Assistant Examiner — Nickolas Harm
(74) Attorney, Agent, or Firm — Westerman, Hattori, Daniels & Adrian, LLP

(57) ABSTRACT

Disclosed is a method for separating a bonded body, whereby the bonded body can be separated easily. Specifically disclosed is a method for separating bonded bodies that includes a step that irradiates excimer light with a central wavelength of 1 to 300 nm on to a bonded body that has been formed by using an adhesive composition to bond substrates together, which includes and is formed by one type or two or more types of meth (acrylate) that have one or more (meth)acryloyl groups, and by hardening of said adhesive composition. At least one of the substrates is permeable to the excimer light.

14 Claims, No Drawings

METHOD FOR SEPARATING BONDED BODIES USING EXCIMER LIGHT IRRADIATION

TECHNICAL FIELD

The present invention is related to a method for separating bonded parts with excimer light irradiation.

RELATED ART

Traditionally, optical lenses, prisms, arrays, silicon wafers, and semiconductor packaging components have been mechanically affixed by means of bolts and screws. However, in recent years, reduction of components and a trend towards thinner products have led to an increase in the use of adhesives to secure components in order to lessen distortion and improve productivity in yield.

With the increased use of adhesives to affix components, highly reliable adhesives have appeared on the market with high adhesion strength, and resistance to heat and humidity. On the other hand, once affixed with these kinds of adhesives, components are difficult to separate an issue that has become increasingly important in recent years. In particular, optical lenses, prisms, arrays, silicon wafers, and semiconductor packaging components are all expensive, and incorrect positioning at the time of adhesion leads to a significant drop in production yield. Organic solvents, strong acid solutions, and strong alkali solutions are known to be used to separate bonded parts, but there are also issues with these, namely the use of large amounts of solvent for extended periods, and the detrimental impact to the environment and human body.

Viewing from this background are disclosed adhesives (Patent Documents 1-5) and methods for separating bodies bonded with the adhesives using irradiation by UV light or heat.

Laid-open Patent Publication No. 2006-188586 (Patent Document 1) describes a stimulable, peelable adhesive composition comprising a gas generating agent that emits a gas when stimulated by a photocurable resin, such as a methacrylic polymer with functional groups in the molecules, or a photopolymerization initiator. According to the documents, the said composition exhibits superior adhesion in response to elements of various shapes made of glass, plastic, or metal, while it is also easily peelable as required. Specifically, the adhesive composition is applied between two elements, and the elements are firmly affixed to one another by irradiating the adhesive with light. By later stimulating the adhesive composition with light or heat, a gas is emitted from the gas generating agent, and this gas is released to the surfactants of the elements without causing the cured adhesive composition to foam and the two elements may be easily peeled apart. Also described are examples of bonded parts peeled apart after irradiation with UV light.

Japanese laid-open Patent Publication No. 6-264033 (Patent Document 2) describes using a specific component including an acrylic acid ester polymer having an alkoxy group, and through use of a polymerization inhibitor in combination with that specific component making an adhesive with superior chemical resistance that maintains its adhesion power without polymerization even when heated to high temperatures. The adhesive is easy to peel off without a great reduction in adhesion strength or transfer of adhesive to the adherend surface even after irradiation. Also described are examples of ultra violet irradiation.

Japanese laid-open Patent Publication No. 2001-212900 (Patent Document 3) describes a laminate body obtained by laminating a substrate (A), a foaming agent containing cross-linked polymer (B) and cross-linked polymer (C) in this order. Also described is the process whereby upon irradiating the laminate body with energy, the component (B) begins foaming, so that the substrate can be easily peeled from the laminate body, retrieved, and reused. Examples of energy for irradiating the laminate body include light energy such as UV light, visible light, infrared light, laser light; electro-magnetic energy such as microwaves, ultrasound, shock waves, electric waves, magnetic waves; and heat energy such as heating, cooling. Among these, irradiation by light energy or heat energy is preferable, and heating in particular is suitable.

Japanese laid-open Patent Publication No. 2003-286464 (Patent Document 4) describes an epoxy-based adhesive composition combining a peelable agent (B) with a foaming agent (C) to an epoxy-based adhesive. Also described is that the said composition has initial adhesion for the time of manufacture of a bonded part, and does not lose adhesion strength when left in 90° C. conditions for 168 hours. Rather, by irradiating the composition with energy, the joined bodies can be easily peeled apart with very little adhesive residue. Examples of the irradiated energy described include light energy such as UV light, visible light, infrared light, laser light; electro-magnetic energy such as microwaves, ultrasound, electric waves, magnetic waves; and heat energy such as heating, cooling. Among these, irradiation by light energy or heat energy is preferable, and heating in particular is suitable.

Japanese Laid-open Patent Publication No. 2006-111716 (Patent Document 5) describes an epoxy resin composition for an adhesive giving easily separating properties comprising an epoxy resin (A) having a specific functional group and a curing agent (B). Also described is that such an epoxy resin composition exhibits enough peelability without using a foaming agent or releasing agent which is employed in purpose of realizing peelability, and extremely excellent in initial adhesion. Examples for irradiated energy for the bonded body include light energy such as UV light, visible light, infrared light, laser light; electro-magnetic energy such as microwaves, ultrasound, electric waves, magnetic waves; and heat energy such as heating, cooling. Among these, irradiation by light energy or heat energy is preferable, and heating in particular is suitable.

PRIOR ART DOCUMENTS

Patent Documents

[Patent Document 1] Japanese laid-open Patent Publication No. 2006-188586
[Patent Document 2] Japanese laid-open Patent Publication No. 6-264033
[Patent Document 3] Japanese laid-open Patent Publication No. 2001-212900
[Patent Document 4] Japanese laid-open Patent Publication No. 2003-286464
[Patent Document 5] Japanese laid-open Patent Publication No. 2006-111716

BRIEF DESCRIPTION OF THE INVENTION

Problem to be Solved by the Invention

Conventional techniques impart separability at the expense of adhesion reliability, and the demands on adhesives for fixed components in recent years regarding heat resistance, moisture resistance, and lightfastness have not been sufficiently met. More specifically, heat resistance and lightfastness are sacrificed with separation and peeling through exposure to heat or UV light, which creates a mixture of foaming agents, and introduces weak functional groups through heat and light, thereby significantly sacrificing heat resistance and lightfastness. Adhesives that may be separated or peeled off with water or hot water are also easily separated in high humidity conditions, reducing the heat resistance and moisture resistance properties of the bonded part.

One of the problems to be solved by the present invention is to provide a method of easily separating bonded parts using adhesives with superior heat resistance, moisture resistance, and lightfastness.

Means of Solving the Problem

In order to solve the aforementioned problem, the inventors of the present invention have conducted extensive investigations, eventually discovering that bonded parts can be easily separated by irradiating a bonded part with substrates adhered using an acrylic adhesive with a given structure, using excimer light with a center wavelength of 1 to 300 nm.

Accordingly, in one aspect the present invention is a method of separating a bonded part with at least one substrate transparent to excimer light, the substrates being bonded together using an adhesive composition comprising one or more types of methacrylate having more than one type of methacryloyl group, the bonded part formed by curing said adhesive composition, and including a step of irradiation with an excimer light having a center wavelength of 1 to 300 nm, preferably 172 nm or 193 nm.

In another embodiment, the aforementioned adhesive composition has a storage elastic modulus greater than or equal to 1000 MPa.

In another embodiment, the aforementioned adhesive composition has a tensile shear adhesion greater than or equal to 5 MPa.

In another embodiment, the aforementioned adhesive composition has a peel rate less than or equal to 10% according to the heat resistance peel test.

In another embodiment, the aforementioned adhesive composition has a peel rate less than or equal to 10% according to the moisture resistance peel test.

In another embodiment, the aforementioned adhesive composition has a peel rate less than or equal to 10% according to the lightfastness peel test.

In another embodiment, the aforementioned (meth)acrylate is selected from a group consisted of isobornyl (meth)acrylate, 2-hydroxyethyl (meth)acrylate, dicyclopentenyloxyethyl (meth)acrylate, and a (meth)acrylate oligomer with a main-chain backbone of at least one selected from a group consisted of polybutadiene or hydrogenated polybutadiene, having at least one (meth)acryoyl group, and the number average molecular weight of 500 to 5000.

In another embodiment, the total amount of the excimer light irradiation is greater than or equal to 1 $J/cm^2$ and less than or equal to 1000 $J/cm^2$.

Effects of the Invention

According to the present invention, it is possible to easily separate bonded parts in which use an acrylic adhesive is employed, being normally difficult to separate, and which has superior heat resistance, moisture resistance, and lightfastness properties. The present invention will thus contribute to improvements in production yield when affixing optical lenses, prisms, arrays, silicon wafers, semiconductor packaging components, etc.

Method for Carrying Out the Invention

1. Bonded Parts

Bonded parts appropriate for separation according to the present invention are formed by affixing two substrates with an adhesive composition (referred to also "acrylic adhesive" below) containing one or more type (meth)acrylates having at least one of (meth)acryloyl group, and then curing the said adhesive composition.

As substrates used in separation method of the present invention, it is preferable that at least one of the substrates be transparent to excimer light, to allow the excimer light to reach the cured adhesive. The central wavelength of the excimer light is preferably 1-300 nm, more preferably 170-200 nm, with 172 nm or 193 nm being more preferable still. A setting of 172 nm is most preferable.

"Transparent" refers to substrates that have a transparency greater than or equal to 1% and less than or equal to 100%. Such transparent substrates include glass, quartz, calcium fluoride, magnesium fluoride, barium fluoride, sapphire, etc. The selection of one or more inorganic substrates not degraded by excimer light, such as glass, quartz, or calcium fluoride, is preferable.

Transparency can be measured using a commercially available spectrophotometer. Specific examples include the UV-2550 and UV-2450 manufactured by Shimadzu Corporation, the U-3900 and U-7000 manufactured by Hitachi High Technologies, and the V-1000 manufactured by Jasco Corporation. When measuring permeability less than or equal to 200 nm, it is preferable to purge oxygen in the atmosphere using nitrogen, argon, or other gasses, as oxygen will absorb light.

The reason for using acrylic adhesives in the present invention is because bonded parts which have superior heat resistance, moisture resistance, and lightfastness properties and which cannot be easily separated using traditional methods by use of heat, water, and light can be formed. Acrylic adhesives are widely used for their high structural reliability.

Accordingly, the acrylic adhesives used for the present invention have high elasticity and adhesion, with little loss in adhesion in endurance tests for heat resistance, moisture resistance, and lightfastness. Specifically, storage elastic modulus is preferably greater than or equal to 1000 MPa, more preferably greater than or equal to 1500 MPa, and typically 1000 to 9000 MPa. Tensile shear adhesion is preferably greater than or equal to 5 MPa, more preferably greater than or equal to 10 MPa, and typically 5 to 50 MPa.

Peel rate in the heat resistance test is preferably less than or equal to 10%, and more preferably less than or equal to 5%. Peel rate in the moisture resistance test is preferably less than or equal to 10%, and more preferably less than or equal to 5%. Peel rate in the lightfastness test is preferably less than or equal to 10%, and more preferably less than or equal to 5%.

In the invention, the storage elastic modulus is measured by the following method. That is, storage elastic modulus E' is measured using a dynamic viscoelasticity spectrometer with frequency of 1 Hz and at a temperature of 23° C. on a cured test specimen with dimensions horizontal 20 mm×vertical 20 mm×thick 1 mm manufactured under the curing conditions described below. Dynamic viscoelasticity as used herein refers to the viscoelasticity of an object observed when strain or stress is periodically applied. Storage elastic modulus E' herein is expressed as the ratio of stress and strain to the E* complex modulus, in accordance with the definition of modulus of elasticity. Herein it indicates the real part E' in the equation E*=E'+iE". In addition, the imaginary part is indicated by the loss elastic modulus E". Since the elastic energy stored in the viscoelastic body between periods is proportional to E', and the energy which the viscoelastic body loses as heat is proportional to E", these terms are called storage elastic modulus and loss elastic modulus, respectively.

Well-known, commercially available dynamic viscoelasticity spectrometers can be used to measure the dynamic viscoelasticity of the present invention. Specific examples include the RSAIII, manufactured by TA Instruments, and the DMS210 and DMS6100, manufactured by SII NanoTechnology Inc.

Curing Conditions (1) UV-Curable Acrylic Adhesives

After application to the substrate, the adhesive is cured through irradiation with a mercury-xenon UV irradiation lamp set to output 4000 mJ/cm$^2$ and with a wavelength of 365 nm.

(2) Two-Component Room Temperature-Curable Acrylic Adhesives

Agents A and B are mixed together in a 1:1 ratio (by mass) using a Teflon™ rod until well mixed, at which time the mixture is applied to the substrate, and then left to cure for 24 hours in an environment of 23° C. and 50% relative humidity.

(3) Other Adhesives

Moisture-curable acrylic adhesives, acrylic emulsion adhesives, hot melt adhesives, and other adhesives will be left to stand for one day after application to the substrate, at a temperature of 23° C. and relative humidity of 50%.

In addition, when evaluating characteristics such as storage elastic modulus using a cured body alone, it is necessary to peel away the cured body. In these cases, a sheet of mold release film (PET film, for example) or a mold release agent is applied to the substrate.

In the invention tensile shear adhesion is measured by using the following method.

A resin composition is applied to one of the glass test specimens measuring horizontal 25 mm×vertical 25 mm×thick 2 mm. Afterward, that test specimen is superimposed on another such that the adhesive thickness is 80 μm, and then cured under the aforementioned conditions, upon which it becomes a final test specimen. Additionally, tensile shear adhesion (unit of measurement: MPa) is measured with a tensile speed of 10 mm/minute in an environment with temperature of 23° C. and relative humidity of 50%. JIS K 6850 will be followed for other, non-explicit conditions.

In the invention peel rate is measured through a heat-resistance test according to the following procedure.

Step 1: a resin composition is cured under the aforementioned curing conditions on a quartz substrate 30 mmΦ in diameter and 3 mm in thickness, creating an adhesive test specimen of shape 20 mmΦ in diameter and 80 μm in thickness (referred to "test specimen").

Step 2: place the test specimen with the substrate side down onto a hotplate with temperature of 200° C., and heat for 3 hours.

Step 3: the cured resin layer is cut into a lattice of 25 squares, each of 2 mm×2 mm, in an environment with temperature of 23° C. and relative humidity of 50%, after which cellophane tape (24 mm in width and adhesion of 23 N/10 mm) is affixed and a 180° peel test is then conducted. The results of the above crosscut test are then calculated as a peel rate according to Formula 1 below. "Peeled" herein refers to the tape of a specimen peeling completely off. JIS K 5600-5-6 will be followed for other, non-explicit conditions.

peel rate(%)={(number of specimens peeled)/(total specimens)}×100   Formula 1

In the invention peel rate under a moisture-resistance test is measured according to the following method.

Step 1: the same as the heat resistance test.

Step 2: insert the test specimen into the pressure cooker (PCT), and expose to conditions of 121° C. temperature, 100% relative humidity, and 2 atmospheres for 24 hours.

Step 3: the same as the heat resistance test.

In the invention peel rate under a lightfastness test is measured according to the following method.

Step 1: the same as the heat resistance test.

Step 2: insert the test specimen into the lightfastness tester (fade meter, carbon arc lamp), and expose for 100 hours (center wavelength of 388 nm and irradiation strength of 50 mW/cm$^2$).

Step 3: the same as the heat resistance test.

Acrylic adhesives used in the present invention may be UV-curable acrylic adhesives, room temperature-curable acrylic adhesives, moisture-curable acrylic adhesives, acrylic emulsion adhesives, or hot-melt adhesives. Among acrylic adhesives, UV-curable acrylic adhesives and/or room temperature-curable acrylic adhesives with good adhesion reliability are preferable.

UV-curable acrylic adhesives preferably contain (meth)acrylate and a photopolymerization initiator. It is preferable for the (meth)acrylate to contain one or more (meth)acryloyl groups per molecule due to the greater effect on adhesion reliability, and further it is preferable to employ one or more of such (meth)acrylates.

Below are examples of specific (meth)acrylates with one or more (meth)acryloyl groups, though (meth)acrylates are not limited to this list.

2-hydroxyethyl (meth) acrylate; dicyclopentenyloxyethyl (meth)acrylate; methyl (meth)acrylate; ethyl (meth)acrylate; propyl (meth)acrylate; n-butyl (meth)acrylate; isobutyl (meth) acrylate; tert-butyl (meth) acrylate; 2-ethylhexyl (meth)acrylate; isodecyl (meth)acrylate; lauryl (meth)acrylate; stearyl (meth)acrylate; isostearyl (meth)acrylate; tridecyl (meth)acrylate; behenyl (meth)acrylate; cyclohexyl (meth)acrylate; tert-butyl cyclohexyl (meth)acrylate; benzyl (meth) acrylate; dicyclopentanyl (meth) acrylate; dicyclopentenyl (meth)acrylate; isobornyl (meth)acrylate; 2-methyl-2-adamantyl (meth)acrylate; allyl (meth)acrylate; 2-hydroxyethyl (meth) acrylate; 2-hydroxypropyl (meth) acrylate; 2-hydroxybutyl (meth)acrylate; 2-hydroxyethyl (meth)acryloyl phosphate; 4-hydroxybutyl (meth) acrylate; 2-(meth)acryloyloxyethyl-2-hydroxypropyl phthalate; glycerin di(meth)acrylate; 2-hydroxy-3-acryloyloxy propyl (meth)acrylate; caprolactone-modified-2-hydroxyethyl (meth)acrylate; pentaerythritol tri(meth)acrylate; dipentaerythritol penta(meth)acrylate; caprolactone-modified-2-hydroxyethyl (meth) acrylate; and dicyclopentenyloxyethyl (meth)acrylate. These may be used independently or in combinations of two or more. Because of their effect on adhesion reliability, the use of one or more of a group consisted of isobornyl (meth)acrylate, 2-hydroxyethyl (meth)acrylate, or dicyclopentenyloxyethyl (meth)acrylate is preferable.

Further, as a (meth)acrylate within the present invention, including a (meth)acrylate oligomer with a main-chain backbone of at least one of a group consisted of polybutadiene, polyisoprene, and their hydrogenated products, having at least one (meth)acryloyl group, and the number average molecular weight of 500 to 5000 is preferable. The number average molecular weight referred to herein is the number average molecular weight in terms of polystyrenes measured with gel permeation chromatography (GPC).

The main-chain backbone of the (meth)acrylate oligomer is at least one type selected from a group consisted of polybutadiene, polyisoprene, hydrogenated polybutadiene, and hydrogenated polyisoprene. Polybutadiene or hydrogenated polybutadiene are preferably selected.

There are no particular limitations on the microstructure of polybutadiene, and any low-cis polybutadiene backbone with a low percentage of 1,4-cis monomer units, high-cis polybutadiene backbone with a high percentage of 1,4-cis monomer units, or 1,2-polybutadiene backbone may be used. However, according to studies done by the inventors, selecting 1,2-polybutadiene is preferable.

From a heat- and weather-resistance standpoint, when using hydrogenated polybutadiene or hydrogenated polyisoprene, the hydrogenation rate is preferably 80% or greater, more preferably 85% or greater, with 90% or greater being more preferable still. Further, the hydrogenation rate referred to herein is the proportion of hydrogenated monomer units relative to the total diene monomer units in the hydrogenated polybutadiene or hydrogenated polyisoprene.

The number average molecular weight of the (meth)acrylate oligomer is 500 to 5000, preferably 800 to 2500, more preferably 1100 to 2200. When the number average molecular weight is greater than or equal to 500, the hardness of the cured resin composition of the present invention is not too low, and adhesive layers are easily formed. On the other hand, when the number average molecular weight is less than or equal to 5000, the viscosity of the resin composition is not too high, and workability when used in mixing and the like appearing in manufacturing processes or when using the said resin composition in practical applications is excellent.

The NISSO-PB TEAI-1000 (both terminal acrylate-modified hydrogenated butadiene oligomer) and NISSO-PB TE-2000 (both terminal methacrylate-modified butadiene oligomer) manufactured by Nippon Soda Co., Ltd. are examples of (meth)acrylate oligomers with a main-chain backbone of at least one of a group consisted of polybutadiene and hydrogenated polybutadiene, having at least one (meth) acryoyl group, and the number average molecular weight of 500 to 5000.

As (meth)acrylates of the UV-curable acrylic adhesive is preferred a mixture of for 100 parts by mass of (meth)acrylate 25 to 75 parts by mass of isobornyl (meth)acrylate, 1 to 25 parts by mass of 2-hydroxyethyl (meth)acrylate, 20 to 70 parts by mass of a (meth)acrylate oligomer that has a main-chain backbone of at least one of a group consisted of polybutadiene and hydrogenated polybutadiene, having at least one (meth)acryoyl group, and the number average molecular weight of 500 to 5000, more preferred a mixture of for 100 parts by mass of (meth)acrylate 30 to 50 parts by mass of isobornyl (meth)acrylate, 5 to 15 parts by mass of 2-hydroxyethyl (meth)acrylate, and 45 to 55 parts by mass of a (meth)acrylate oligomer that has a main-chain backbone of at least one of a group consisted of polybutadiene and hydrogenated polybutadiene, having at least one (meth)acryoyl group, and the number average molecular weight of 500 to 5000.

As (meth)acrylates of the two-component room temperature curable acrylic adhesive is preferred a mixture of for 100 parts by mass of (meth)acrylate 5 to 40 parts by mass of dicyclopentenyloxyethyl (meth)acrylate, 40 to 80 parts by mass of a (meth)acrylate oligomer that has a main-chain backbone of at least one of a group consisted of polybutadiene and hydrogenated polybutadiene, having at least one (meth) acryoyl group, and the number average molecular weight of 500 to 5000, and 5 to 40 parts by mass of 2-hydroxyethyl (meth)acrylate, more preferred a mixture of for 100 parts by mass of (meth)acrylate 10 to 30 parts by mass of dicyclopentenyloxyethyl (meth)acrylate, 50 to 70 parts by mass of a (meth)acrylate oligomer that has a main-chain backbone of at least one of a group consisted of polybutadiene and hydrogenated polybutadiene, having at least one (meth)acryoyl group, and the number average molecular weight of 500 to 5000, and 10 to 30 parts by mass of 2-hydroxyethyl (meth) acrylate.

Examples of photopolymerization initiators include benzophenone; 4-phenyl benzophenone; benzoyl benzoic acid; 2,2-diethoxyacetophenone; bis-diethylamino benzophenone; benzil; benzoin; benzoyl isopropyl ether; benzyl dimethyl ketal; 1-hydroxycyclohexyl phenyl ketone; thioxanthone, 1-(4-isopropylphenyl)-2-hydroxy-2-methyl-propan-1-one; 1-(4-(2-hydroxyethoxy)-phenyl)-2-hydroxy-2-methyl-1-propan-1-one; 2-hydroxy-2-methyl-1-phenyl-propan-1-one; camphorquinone; 2,4,6-trimethylbenzoyl diphenylphosphine oxide; bis(2,4,6-trimethylbenzoyl)-phenylphosphine oxide; 2-methyl-1-(4-(methylthio)phenyl)-2-morpholino-propan-1-one; 2-benzyl-2-dimethylamino-1-(4-morpholinophenyl)-1-butanone-1; and bis(2,6-dimethoxybenzoyl)-2,4,4-trimethylpentylphosphine oxide. These can be used alone or in combinations of two or more. Among these, benzyl dimethyl ketal is preferred for its high reactivity and fast curing.

The amount of photopolymerization initiator used for 100 parts by mass of (meth)acrylate is preferably 0.05 to 2 parts by mass, with 0.2 to 1 part by mass being more preferable.

It is preferable for room temperature-curable acrylic adhesives to contain a (meth)acrylate, a radical polymerization initiator, and a decomposition accelerator.

Specific examples of (meth)acrylate are similar to UV-curable acrylic adhesives.

As a radical polymerization initiator, organic peroxides such as cumene hydroperoxide; para-menthane hydroperoxide; tert-butyl hydroperoxide; di-isopropylbenzene dihydroperoxide; methyl ethyl ketone peroxide; benzoyl peroxide; and tert-butyl peroxybenzoate are preferable, and one or more types can be used. Among these cumene hydroperoxide has the greatest effect, and is preferred.

The amount of radical polymerization initiator used is preferably 0.5 to 10 parts by mass for 100 parts of (meth)acrylate, with 1 to 7 parts by mass being more preferable.

Decomposition accelerator that react with the radical polymerization initiator at room temperature to generate a radical are preferred. Tertiary amines, thiourea derivatives, and metal salts are examples of decomposition accelerator. Triethylamine; tripropylamine; tributylamine; and N,N-dimethyl para-toluidine are examples of tertiary amines. 2-mercaptobenzimidazole; methylthiourea; dibutylthiourea; tetramethylurea; and ethylene thiourea are examples of thiourea derivatives. Cobalt naphthenate; copper naphthenate; and vanadyl acetylacetonate are examples of metal salts. One or more types of these can be used. Among them, metal salts cure quickly and are thus preferable, with vanadyl acetylacetonate being more preferable.

The amount of decomposition accelerator used is preferably 0.05 to 5 parts by mass for 100 parts by mass of (meth) acrylate, with 0.1 to 2 parts by mass being more preferable.

As a room temperature-curable acrylic adhesive, the use of a two-component room temperature-curable adhesive is preferable. A two-component adhesive can be used as an embodiment of a two-component room temperature-curable acrylic adhesive. In two-component system, all components essential to the adhesive of the present invention are not mixed during storage, rather the adhesive being separated into Agent A and Agent B, Agent A having at least a radical polymerization initiator, and Agent B having at least a decomposition accelerator, and the two agents being stored separately. In this case, the two-component room temperature-curable acrylic adhesive can be used by both agents being applied to the adherends simultaneously or separately, after which the adherends are made to come in contact with each other and then cured.

Other Components

Small amounts of polymerization inhibitors may be added to the acrylic adhesives used in the present invention to improve storage stability. Examples of these polymerizations include methyl hydroquinone; hydroquinone; 2,2-methylenebis(4-methyl-6-tert-butylphenol); catechol; hydroquinone monomethyl ether; monotert-butylhydroquinone; 2,5-di-tert-butylhydroquinone; p-benzoquinone; 2,5-diphenyl-p-benzoquinone; 2,5-ditert-butyl-p-benzoquinone; picric acid; citric acid; phenothiazine; tert-butyl catechol; 2-butyl-4-hydroxyanisole; and 2,6-ditert-butyl-p-cresol.

If the amount of polymerization inhibitor used is too small, then the storage stability effect will not be sufficient. However, if excess inhibitor is used, then curability and adhesion decreases. Because of this, if assumed 100 parts by mass for the total amount of the acrylic adhesive, then 0.001 parts by mass or more and 3 parts by mass or less of polymerization inhibitor is preferable. Further, 0.01 parts by mass or more and 2 parts by mass or less of polymerization inhibitor is more preferable.

One or more types of organic or inorganic filler can be added to the adhesives used in the present invention in order to adjust viscosity, flexibility and thixotropy as long as they do not affect the storage stability and curing time. Examples of inorganic filler include silica sand, silica, carbon black, wollastonite, clay, titanium oxide, magnesium oxide, iron oxide, bentonite, mica, lead chromate, nickel slag, aluminum hydroxide, alumina powder with spheres, stainless steel powder, silicon carbide powder, silicon nitride powder, boron nitride powder, talcum powder, calcium carbonate powder, glass beads, Shirasu balloon, aluminum powder, and titanium powder. Examples of organic filler include polyethylene powder, coal tar, urethane resin powder, (meth)acrylic resin powder, silicone resin powder, fluorine resin powder, phenolic resin powder, wood powder, and recycled rubber powder.

If too little filler is used the effect may not be sufficient. However, if too much filler is used curability or adhesion may be reduced. Because of this if assumed 100 parts by mass for the total amount of acrylic adhesive, 1 parts by mass or more and 500 parts by mass or less of filler is preferable. Further, 10 parts by mass or more and 300 parts by mass or less of filler is more preferable.

The addition of a coupling agent to the acrylic adhesives used in the present invention for the purpose of improving adhesion is preferred. Examples of coupling agents include silane coupling agents and titanate coupling agents. Coupling agents can be used alone or in combinations of two or more.

Examples of the aforementioned coupling agents include, but are not limited to, γ-chloropropyl trimethoxysilane; vinyl trimethoxysilane; vinyl trichlorosilane; vinyl triethoxysilane; vinyl-tris(β-methoxyethoxy) silane; γ-methacryloxypropyl trimethoxysilane; γ-acryloxypropyl trimethoxysilane; β-(3, 4-epoxycyclohexyl) ethyl trimethoxysilane; γ-glycidoxypropyltrimethoxysilane; γ-mercaptopropyltrimethoxysilane; γ-aminopropyltriethoxysilane; N-(β aminoethyl) γ aminopropyltrimethoxysilane; N (β aminoethyl) γ-aminopropylmethyldimethosysilane; and γ-ureidopropyltriethoxysilane.

The aforementioned titanate coupling agent may include, but is not limited to, isopropyl tri-isostearoyl titanate; isopropyl tridodecyl benzenesulfonyl titanate; isopropyl tri(dioctylpyrophosphate) titanate; tetraisopropyl bis(dioctylphosphite) titanate; tetraoctyl bis(ditridecylphosphite) titanate; tetra (2,2-diallyloxy-1-butyl) bis(ditridecylphosphite) titanate; bis(dioctylpyrophosphate) oxyacetate titanate; bis(dioctylpyrophosphate) ethylene titanate; isopropyl trioctanoyl titanate; isopropyl dimethacryl isostearoyl titanate; isopropyl isostearoyl diacryl titanate; isopropyl isotri(dioctyl phosphate) titanate; isopropyl tricumylphenyl titanate; isopropyl tri(N-aminoethyl-aminoethyl) titanate; dicumyl phenyloxyacetate titanate; and di-isostearoyl ethylene titanate.

In order to achieve good adhesion reliability, the amount of coupling agent is preferably 0.1 to 100 parts by mass for 100 parts by mass of acrylic adhesive in total, with 1 to 5 parts by mass of coupling agent being more preferable.

Commonly used solvents, fillers, reinforcements, plasticizers, thickeners, thixotropic additives, chelating agents, dyes, pigments, flame retardants, surfactants and the like may be optionally added to acrylic adhesives used in the present invention as long as they do not impair the purposes of the present invention.

2. The Separation of a Bonded Part Using Excimer Light

In the present invention adhesion in a bonded part is reduced by irradiating by excimer light. The bonded part may thereby be easily separated. Within the present invention, "separation" is a concept that includes all aspects of the separation of substrates bonded by adhesives, and naturally includes separation by peeling off.

The excimer light used to irradiate the bonded part employed, since it is of a single wavelength thereby to suppress the heating substrate and the deformation of the substrate due to heat.

When the wavelength of the irradiating excimer light is too short, transmission to the substrate is reduced, while when it is too long, energy is reduced and the bonded parts becomes difficult to peel off. Thus setting the center wavelength of the irradiating excimer light to 1 to 300 nm is preferable, a setting of 170 to 200 nm is more preferable, and settings of 172 nm or 193 nm are more preferable still. A setting of 172 nm is the most preferable. If the center wavelength is within the above range, light greater than 350 nm yet less than or equal to 780 nm used for practical purposes does not reduce lightfastness in response to, for example, visible light.

As long as the center wavelength of the light source is in the above range, the light source is not specifically limited, for example, a lamp, laser. A lamp is preferable in view of its wide irradiation area. Xenon (with a center wavelength of 172 nm or 193 nm) is one example of such a light source.

There are no particular restrictions on excimer light direction as long as the excimer light reaches the adhesive. In view of the efficiency of irradiating, it is preferred to make irradiation in the direction from the side of the transparent substrate. In the case that good peelability is realized, the bonded part may be easily separated by hand.

Irradiation energy of excimer light of 1 to 1000 J/cm$^2$ is preferable, and 10 to 500 J/cm$^2$ is more preferable. Peeling becomes easier at energies greater than or equal to 1 J/cm$^2$, and energies of 1000 J/cm$^2$ or less will never be unproductive.

Excimer light irradiation may be made in an open environment, however, in cases where excimer light may be absorbed by oxygen in the air it is preferable to purge the oxygen inert gasses such as nitrogen, argon, carbon dioxide prior to irradiation.

The present invention is suitable for use in the separation of optical lenses, prisms, arrays, silicon wafers, and semiconductor packaging components affixed as bonded parts. Further, the method of the present invention can be used as a method for temporarily affixing components in processing the components.

EXAMPLES

The present invention is explained in greater detail using the examples and comparative examples below. The present invention is not limited to these examples.

I. Preparation of Adhesives

Adhesives 1, 2, and 3 were prepared according to the procedures shown below.

Adhesive 1: UV Curable Acrylic Adhesive

A resin composition was prepared by sufficiently stirring until each dissolved 40 parts by mass of isobornyl methacrylate ("Light Ester IB-X" manufactured by Kyoeisha Chemical Co. Ltd.); 10 parts by mass of 2-hydroxyethyl methacrylate ("Acrylester HO" manufactured by Mitsubishi Rayon Co. Ltd.); 50 parts by mass of both terminal acrylate-modified hydrogenated butadiene oligomer ("NISSO-PB TEAI-1000" manufactured by Nippon Soda Co., Ltd.; the number average molecular weight of 1200 in terms of polystyrene determined by GPC; a hydrogenated 1,2-polybutadiene structure, and hydrogenation rate of 97%); 2.5 parts by mass of γ-methacryloyloxypropyltrimethoxysilane ("Silquest A-174" manufactured by Momentive) as an adhesion imparting agent; and 0.5 parts by mass of benzyl dimethyl ketal ("Irgacure-651" by Ciba Japan) as a photo-radical polymerization initiator.

Adhesive 2: Two-Component Room Temperature Curable Acrylic Adhesive

Agent [A]: a resin composition was prepared by sufficiently stirring until each dissolved 20 parts by mass of dicyclopentenyloxyethyl methacrylate ("QM-652" manufactured by Rohm and Haas); 57.5 parts by mass of both terminal methacrylate-modified butadiene oligomer ("NISSO-PB TE-2000" manufactured by Nippon Soda Co., Ltd; the number average molecular weight of 2100 in terms of polystyrene determined by GPC; a 1,2-polybutadiene structure); 20 parts by mass of 2-hydroxyethyl methacrylate ("Acrylester HO" manufactured by Mitsubishi Rayon Co., Ltd.); 2.5 parts by mass of cumene hydroperoxide ("Percumyl H-80" manufactured by NOF Corporation) as a polymerization initiator.

Agent [B]: a resin composition was prepared by sufficiently stirring until each dissolved 20 parts by mass of dicyclopentenyloxyethyl methacrylate ("QM-652" manufactured by Rohm and Haas); 57.5 parts by mass of both terminal methacrylate-modified butadiene oligomer ("NISSO-PB TE-2000" manufactured by Nippon Soda Co., Ltd.; the number average molecular weight of 2100 in terms of polystyrene determined by GPC); 20 parts by mass of 2-hydroxyethyl methacrylate ("Acrylester HO" manufactured by Mitsubishi Rayon Co., Ltd.); 0.6 parts by mass of vanadyl acetylacetonate ("vanadyl acetylacetonate" manufactured by Shinko Chemical Industry Co., Ltd.) as a decomposition accelerator.

Adhesive 3: Two-Component Room Temperature Curable Acrylic Adhesive

Agent [A]: a resin composition was prepared by sufficiently stirring until each dissolved 20 parts by mass of dicyclopentenyloxyethyl methacrylate ("QM-652" manufactured by Rohm and Haas); 57.5 parts by mass of both terminal methacrylate-modified butadiene oligomer ("NISSO-PB TE-2000" manufactured by Nippon Soda Co., Ltd; the number average molecular weight of 2100 in terms of polystyrene determined by GPC; a 1,2-polybutadiene structure); 20 parts by mass of 2-hydroxyethyl methacrylate ("Acrylester HO" manufactured by Mitsubishi Rayon Co., Ltd.); 2.5 parts by mass of cumene hydroperoxide ("Percumyl H-80" manufactured by NOF Corporation) as a polymerization initiator; 0.1 parts by mass of 2,2-methylenebis(4-methyl-6-tert-butylphenol) ("Sumilizer MDP-S" manufactured by Sumitomo Chemical Co., Ltd.) as a polymerization inhibitor; 30 parts by mass of silica powder ("Denka Fused Silica" made by Denki Kagaku Kogyo Kabushiki Kaisha) as an inorganic filler; and 3 parts by mass of γ-methacryloxypropyltrimethoxysilane ("KBM-503" manufactured by Shin-Etsu Chemical Co. Ltd.) as a silane coupling agent.

Agent [B]: a resin composition was prepared by sufficiently stirring until each dissolved 20 parts by mass of dicyclopentenyloxyethyl methacrylate ("QM-652" manufactured by Rohm and Haas); 57.5 parts by mass of both terminal methacrylate-modified butadiene oligomer ("NISSO-PB TE-2000" manufactured by Nippon Soda Co., Ltd.; the number average molecular weight of 2100 in terms of polystyrene determined by GPC); 20 parts by mass of 2-hydroxyethyl methacrylate ("Acrylester HO" manufactured by Mitsubishi Rayon Co., Ltd.); 0.6 parts by mass of vanadyl acetylacetonate ("vanadyl acetylacetonate" manufactured by Shinko Chemical Industry Co., Ltd.) as a decomposition accelerator; 0.1 part by mass of 2,2-methylene-bis(4-methyl-6-tert-butylphenol) ("Sumilizer MDP-S" manufactured by Sumitomo Chemical Co., Ltd.) as a polymerization inhibitor; 30 parts by mass of silica powder ("Denka Fused Silica" manufactured by Denki Kagaku Kogyo Kabushiki Kaisha) as an inorganic filler; and γ-methacryloxypropyltrimethoxysilane ("KBM-503" manufactured by Shin-Etsu Chemical Co. Ltd.) as a silane coupling agent.

Curing Conditions

The following curing conditions were used for evaluation tests II, III, and IV.

Adhesive 1: A UV-Curable Acrylic Adhesive

After application to the substrate, the adhesive was cured by irradiation in the amount of 4000 mJ/cm$^2$ and with a wavelength of 365 nm using a mercury xenon UV irradiation lamp ("SP-7" manufactured by Ushio Inc.).

Adhesives 2 and 3: Two-Component Room Temperature Curable Acrylic Adhesives

Agents A and B were mixed together in a 1:1 ratio (by mass) using a Teflon™ rod until well mixed, at which time the mixture was applied to the substrate, and then left to cure for 24 hours in an environment of 23° C. temperature and 50% relative humidity.

II. Storage Elastic Modulus

For the aforementioned adhesives 1 to 3, storage elastic modulus E' was measured using a dynamic viscoelasticity spectrometer (Model DMS210 manufactured by SII NanoTechnology Inc.) according to previously described testing procedures.

III. Tensile Shear Adhesion

For the aforementioned adhesives 1 to 3, tensile shear adhesion was measured using a tensile tester (Model 4467 manufactured by Instron) according to previously described testing procedures).

IV. Crosscut Peel Test Prior to Excimer Light Irradiation Evaluation for Ordinary State A bonded part (test specimen) of diameter 20 mmΦ and thickness 80 μm was created on a quartz substrate of diameter 30 mmΦ and thickness 3 mm by curing a resin composition according to the aforementioned curing conditions.

For each test specimen obtained in the above manner, the cured resin layer was cut into a lattice of 25 squares, each of 2 mm×2 mm, in an environment with temperature of 23° C. and relative humidity of 50%, after which cellophane tape (CT-405AP manufactured by Nichiban: 24 mm in width and adhesion of 23 N/10 mm) was affixed and a 180° peel test was conducted. The results of the crosscut test were then calculated as a peel rate according to Formula 1 below, and specimens with a peel rate of greater than or equal to 90% were deemed peelable. The results of the tests are shown in Table 1. "Peeled" herein refers to the tape of a specimen peeling completely off. JIS K 5600-5-6 was followed for other, non-explicit conditions.

peel rate(%)={(number of specimens peeled)/(total specimens)}×100  Formula 1

Heat Resistance Evaluation

A test specimen was prepared as above and placed substrate side down on a 200° C. hotplate for 3 hours. Once the specimen had cooled to room temperature, a crosscut peel test was conducted and the specimen was compared with an ordinary state. The results of the evaluation are given in Table 1.

Moisture Resistance Evaluation

A test specimen was prepared as above and inserted into a pressure cooker (PCT) (PC-362M Model manufactured by Hirayama Manufacturing Corporation) where it was exposed to temperature conditions of 121° C., relative humidity of 100%, and 2 atmospheres for a period of 24 hours. Using the exposed test specimen, a crosscut peel test was conducted and the specimen was compared with an ordinary state. The results of the evaluation are given in Table 1.

Lightfastness Evaluation

A test specimen was prepared as above, inserted into a lightfastness tester (fade meter, carbon arc lamps: U48 model manufactured by Suga Test Instruments Co., Ltd.), and exposed for 100 hours (center wavelength of 388 nm and irradiation of 50 mW/cm$^2$). Using the exposed test specimen, a crosscut peel test was conducted and the specimen was compared with an ordinary state. The results of the evaluation are given in Table 1.

V. Crosscut Peel Test After Excimer Light Irradiation

A test specimen was prepared as above, and exposed to excimer light irradiation using an excimer lamp light irradiation apparatus ("SCS-02" manufactured by Ushio Inc. with center wavelength of either 172 nm or 193 nm and illuminance of 20 mW/cm$^2$) from the quartz substrate side of the specimen in the irradiation amounts shown in Table 1. Using the exposed test specimen, a crosscut peel test was conducted, and the specimen was compared with an ordinary state. Testing was carried out using a mercury xenon UV lamp device ("SP-7" manufactured by Ushio Inc., wavelength of 365 nm, illuminance of 20 mW/cm$^2$) as a comparison. The results of the evaluation are given in Table 1.

TABLE 1

| | Adhesive | | |
|---|---|---|---|
| | 1 | 2 | 3 |
| Adhesive Type | Acrylic | Acrylic | Acrylic |
| Curing Method | UV light | Two-component room temperature | Two-component room temperature |
| Storage elastic modulus (MPa) | 2050 | 1880 | 1810 |
| Shear tensile adhesion (MPa) Ordinary State | 25 | 26 | 28 |
| | Crosscut peel test (peel rate %) | | |
| Ordinary State | 0 Unpeelable | 0 Unpeelable | 0 Unpeelable |
| Heat resistance (after 3 h exposure at 200° C.) | 0 Unpeelable | 0 Unpeelable | 0 Unpeelable |
| Moisture resistance (after 24 h exposure at 121° C., 100% RH) | 0 Unpeelable | 0 Unpeelable | 0 Unpeelable |

TABLE 1-continued

| | Adhesive | | |
|---|---|---|---|
| | 1 | 2 | 3 |
| Light fastness (carbon arc light, after 100 h exposure) | 0 Unpeelable | 0 Unpeelable | 0 Unpeelable |

| Irradiation conditions | | Total irradiation amount (J/cm$^2$) | Crosscut peel test (peel rate %) | | |
|---|---|---|---|---|---|
| Example 1 | Xe excimer light (center wavelength of 172 nm) | 1 | 92 Peelable | 92 Peelable | 92 Peelable |
| Example 2 | Xe excimer light (center wavelength of 172 nm) | 12 | 100 Peelable | 100 Peelable | 100 Peelable |
| Example 3 | Xe excimer light (center wavelength of 172 nm) | 98 | 100 Peelable | 100 Peelable | 100 Peelable |
| Example 4 | Xe excimer light (center wavelength of 172 nm) | 180 | 100 Peelable | 100 Peelable | 100 Peelable |
| Example 5 | Xe excimer light (center wavelength of 193 nm) | 180 | 100 Peelable | 100 Peelable | 100 Peelable |
| Comparative Example 1 | XeCl excimer light (center wavelength of 308 nm) | 180 | 0 Unpeelable | 0 Unpeelable | 0 Unpeelable |
| Comparative Example 2 | Mercury Xenon UV lamp (center wavelength of 365 nm) | 180 | 0 Unpeelable | 0 Unpeelable | 0 Unpeelable |

The following can be determined from Table 1. According to the present invention, even an adhesive may be superior in terms of heat resistance, moisture resistance and lightfastness, bodies bonded with such adhesive can be easily separated by irradiating it with an excimer light of a predetermined wavelength. According to the present invention, bodies bonded with such adhesive can be easily separated even without the use of a foaming agent.

The invention claimed is:

1. A method for separating bonded parts said bonded parts being formed by bonding two substrates to each other using an adhesive composition comprising one or more types of (meth)acrylate having at least one (meth)acryloyl groups, and curing said adhesive composition, and said at least one substrates being transparent to excimer light, comprising:
   a step of irradiating said bonded parts with excimer light of a center wavelength of 1 to 300 nm,
   wherein said (meth)acrylate is selected from a group consisted of isobornyl (meth)acrylate; 2-hydroxyethyl (meth)acrylate; dicyclopentenyloxyethyl (meth)acrylate; and an (meth)acrylate oligomer with a main-chain backbone of at least one selected from a group consisted of polybutadiene and hydrogenated polybutadiene, having at least one (meth)acryoyl groups, and the number average molecular weight of 500 to 5000.

2. A method for separating bonded parts said bonded parts being formed by bonding two substrates to each other using an adhesive composition comprising one or more types of (meth)acrylate having at least one (meth)acryloyl groups, and curing said adhesive composition, and said at least one substrates being transparent to excimer light, comprising:

a step of irradiating said bonded parts with excimer light of a center wavelength of 172 nm or 193 nm, wherein said (meth)acrylate is selected from a group consisted of isobornyl (meth)acrylate; 2-hydroxvethyl (meth)acrylate; dicyclopentenyloxyethyl (meth)acrylate; and an (meth)acrylate oligomer with a main-chain backbone of at least one selected from a group consisted of polybutadiene and hydrogenated polybutadiene, having at least one (meth)acryoyl groups, and the number average molecular weight of 500 to 5000.

3. The method for separating according to claim 1, wherein said adhesive composition has a storage elastic modulus of greater than or equal to 1000 MPa.

4. The method for separating according to claim 1, wherein said adhesive composition has a tensile shear adhesion of greater than or equal to 5 MPa.

5. The method for separating according to claim 1, wherein said adhesive composition has a peel rate less than or equal to 10% according to the heat resistance peel test.

6. The method for separating according to claim 1, wherein said adhesive composition has a peel rate of less than or equal to 10% according to the moisture resistance peel test.

7. The method for separating according to claim 1, wherein said adhesive composition has a peel rate of less than or equal to 10% in the lightfastness peel test.

8. The method for separating according to claim 1, wherein the total amount of excimer light irradiation is greater than or equal to 1 $J/cm^2$ and less than or equal to 1000 $J/cm^2$.

9. The method for separating bonded parts according to claim 2, wherein said adhesive composition has a storage elastic modulus of greater than or equal to 1000 MPa.

10. The method for separating bonded parts according to claim 2, wherein said adhesive composition has a tensile shear adhesion of greater than or equal to 5 MPa.

11. The method for separating bonded parts according to claim 2, wherein said adhesive composition has a peel rate less than or equal to 10% according to the heat resistance peel test.

12. The method for separating bonded parts according to claim 2, wherein said adhesive composition has a peel rate of less than or equal to 10% according to the moisture resistance peel test.

13. The method for separating bonded parts according to claim 2, wherein said adhesive composition has a peel rate of less than or equal to 10% in the lightfastness peel test.

14. The method for separating bonded parts according to claim 2, wherein the total amount of excimer light irradiation is greater than or equal to 1 J/cm2 and less than or equal to 1000 $J/cm^2$.

* * * * *